United States Patent
Tsao

(10) Patent No.: US 8,688,772 B2
(45) Date of Patent: Apr. 1, 2014

(54) METHOD AND APPARATUS FOR WEB BASED STORAGE ON DEMAND

(75) Inventor: Sheng (Ted) Tai Tsao, San Jose, CA (US)

(73) Assignee: Sheng Tai (Ted) Tsao, Fremont, CA (US)

( * ) Notice: Subject to any disclaimer, the term of this patent is extended or adjusted under 35 U.S.C. 154(b) by 439 days.

(21) Appl. No.: 12/009,936

(22) Filed: Jan. 23, 2008

(65) Prior Publication Data

US 2009/0100163 A1  Apr. 16, 2009

Related U.S. Application Data

(60) Division of application No. 10/713,905, filed on Aug. 12, 2002, now Pat. No. 7,379,990, and a continuation-in-part of application No. 10/713,904, filed on Aug. 6, 2002, now Pat. No. 7,418,702.

(51) Int. Cl.
*G06F 15/16* (2006.01)

(52) U.S. Cl.
USPC .......................................... 709/203; 709/223

(58) Field of Classification Search
USPC ................................................ 709/203, 223
See application file for complete search history.

(56) References Cited

U.S. PATENT DOCUMENTS

| | | | | |
|---|---|---|---|---|
| 7,287,063 | B2* | 10/2007 | Baldwin et al. | 709/216 |
| 2003/0061491 | A1* | 3/2003 | Jaskiewicz et al. | 713/182 |
| 2003/0069922 | A1* | 4/2003 | Arunachalam | 709/203 |

* cited by examiner

*Primary Examiner* — Adnan Mirza

(57) ABSTRACT

The distributed virtual SAN infrastructure provides a plurality of host systems with a scalable dynamically expandable distributed virtual storage pool, which includes a virtual storage automatic construct protocol. The distributed virtual SAN infrastructure includes one or more IP SAN units, the management console, the distributing control management station and the network infrastructure, wherein the network infrastructure provides the communication links between all systems in this distributed virtual SAN.

48 Claims, 8 Drawing Sheets

Distributed Virtual SAN Infrastructure

The UDP packet format used by "Virtual SAN Auto Configuration Protocol"

Example of Storage Volume Information of an IP SAN Unit

Note: Each volume may further be partitioned into small chunk of partition.

Direct Attached Storage System:

In-Band Accessed Virtual SAN

Recovery Scheme of the Distributed Virtual SAN Infrastructure

METHOD AND APPARATUS FOR WEB BASED STORAGE ON DEMAND

CROSS-REFERENCE TO RELATED APPLICATION(S)

The present application is a divisional patent application based on U.S. patent application Ser. No. 10/713,905, filed on Aug. 12, 2002 now U.S. Pat. No. 7,379,990. The present application also is a continuation-in-part (CIP) of parent application Ser. No. 10/713,904 filed on Aug. 6, 2002 now U.S. Pat. No. 7,418,702.

FIELD OF THE INVENTION

The present invention generally relates to computer communications network. More specifically, the present invention relates to web based data storage systems.

BACKGROUND OF THE INVENTION

Today's corporate IT professionals typically face many challenges to handle the ever increasing information and data. To handle large amount of data, many organizations expand their storage capacity by employing manage storage systems locally in order to maintaining their normal business operating. A conventional approach is to use IP based network attached storage ("NAS"), which effectively provides data storage and services for end users. Moreover, at the enterprise level, the majority storage systems are directly attached or connected to server(s) or host(s) as shown in FIG. 7. These server(s) and/or host(s) are typically used as raw block data devices through conventional communication connection media, such as traditional IDE, SCSI, Fibre Channel, or Ethernet.

The server, which is directly attached to a storage system as illustrated in FIG. 7 typically has many drawbacks, which are described as following:

a typical conventional storage management system is only capable of handling 4 TB (terabytes) of data, which is usually not good enough for a typical enterprise storage management system;

The most of servers, which are directly attached to storage systems, have problems for further expanding their storage capacity. For example, it may require to purchase new servers in order to increase storage capacity;

The storage being attached to a server can only be accessed by the attached server and can not be shared by other servers even if server's storage availability is not evenly distributed across all servers within a organization;

Each attached storage system has to be managed separately and this is a nightmare for IT professionals;

With the attached storage system, the backup/restore has to go through the data network, this will tax or reduce the network performance;

A typical SCSI connection only allows a 12-meter distance for data accessing with 15 storage devices. Similarly, Fibre Channel is limited to 10 kilometers communication distance. Distance limitation effectively prevents them from being the best choice for disaster recovery of the storage system; and The Fibre Channel based storage system cannot handle well for the interoperability. Also, Fibre Channel based storage system is expensive to build and to maintain.

FIG. 8 shows a conventional type of virtual SAN, which is in-band controlled and accessed with which the data path from hosts (1 of FIG. 8) to the SAN units (4 of FIG. 8) going through virtual SAN control management station (2 of FIG. 8). It is not efficient in term of accessing the data by the hosts because the virtual SAN control management station can easily be a performance bottleneck. Similarly, the scalability of this type of virtual SAN is poor.

SUMMARY

With rapid development of high speed communication technology, the problems mentioned above can be solved by an IP based out-band accessed distributed virtual SAN infrastructure (FIG. 1) of this invention. With this invention, each host (1 of FIG. 1) can directly access IP based SAN units (4 of FIG. 1) without going through control management station (3 of FIG. 1). The IP based out-band accessed distributed virtual SAN infrastructure (FIG. 1) actually represents an example of central controlled distributed scalable virtual machine system (CCDSVM) (FIG. 9). Wherein, each system units actually is a SAN unit (4 of FIG. 1), specifically is an IP based SAN unit.

With this invention, each SAN unit (4 of FIG. 1) can be accessed by one or more hosts (1 of FIG. 1) and each host can access one or more SAN units (FIG. 6). In addition, the storage accessing goes directly through communication link (2 of FIG. 1) between hosts (1 of FIG. 1) and SAN units (4 of FIG. 1) without involvement of the control management station (3 of FIG. 1). Further, the SAN units (4 of FIG. 1) can be dynamically added without interrupting normal data accessing from hosts (1 of FIG. 1) and are controlled, monitored, and managed by a control management station (3 of FIG. 1) through a management console (10 of FIG. 1). The control management station (3 of FIG. 1) may also accept storage volume/partition requests from each host (1 of FIG. 1), and assign the matched volumes/partitions of SAN units (4 of FIG. 1) to these hosts. Therefore, each host (1 of FIG. 1) could directly access the right volumes/partitions of assigned SAN units without going through the control management station again.

This invention will become understood with reference to the following description, claims, and accompanying figures.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The following terms are used through out this patent application to describe the present invention. A central controlled distributed scalable virtual machine ("CCDSVM") system allows a control management station to control a group of systems and to provide distributed services to client systems over the Intranet, Internet, and/or LAN environment. Storage media includes magnetic hard disk drives, solid state disk, optical storage drive, and memory card etc. Storage connection and control media may include controller of IDE, SCSI, Fibre optical, Ethernet, USB, or wireless media, and/or other related cables etc. Each controller of storage media such as Raid, IDE, or SCSI controller may control multiple storage media drivers on a system. Storage system includes one or more storage media devices, storage connections, and/or storage media controllers. Storage system also contains related software modules for delivering storage services.

Storage area network ("SAN") is a storage system that is capable of providing block data services to various computer hosts through storage connection media, such as Fibre-optical cable, Ethernet cable or Internet Protocol ("IP") based connection media protocol or non-IP based connection media protocol. The non-IP based connection media protocol, in one example, includes Fibre-Channel. IP SAN uses IP based protocol to provide storage raw block data services. All discussions of SAN in this invention are within the scope of a model of central controlled distributed scalable virtual machine ("CCDSVM").

DNS stands for domain name server of network technology. DNS is an Internet software infrastructure and is capable of identifying network addresses for its peer systems. For example, the network addresses may be used to communicate with the peer systems. A Simple Network Management Protocol ("SNMP") is a standard Internet protocol. A SNMP trap is a user datagram protocol ("UDP") packet, which may be used to send the SNMP daemon on a SNMP agent system to a SNMP network management station via network links.

Figure 1:
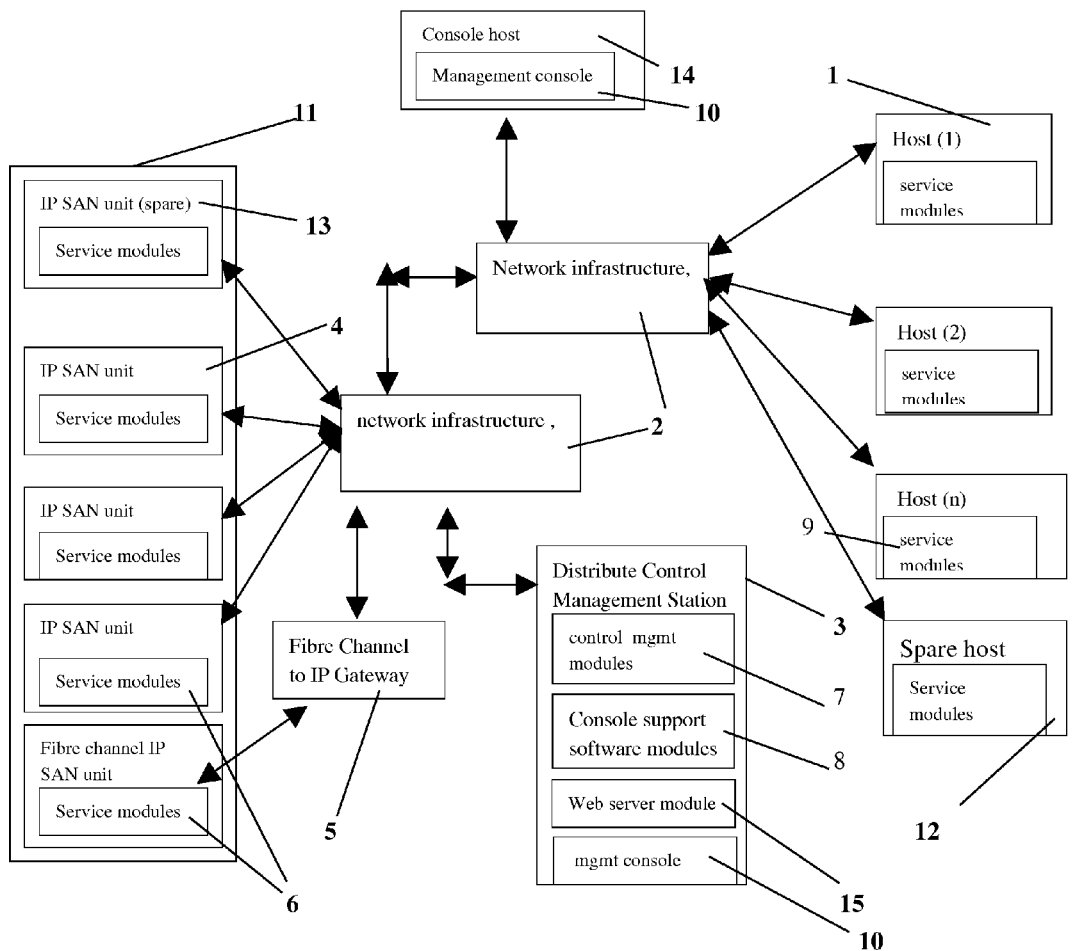
FIG. 1 illustrates a distributed virtual storage area of network ("SAN") infrastructure in accordance with one embodiment of the present invention.

FIG. 1 shows an example of a simplified block diagram of IP based out-band accessed distributed virtual SAN infrastructure. The distributed virtual SAN infrastructure includes multiple hosts (1), network infrastructures (2), a control management station (3), virtual storage pool (11) having multiple IP SAN units, and a management console (10). In one embodiment, each host (1) contains service software modules 9. The service software modules (9) are configured to communicate with a control management software module (7) of a control management station (3) for storing information on a specific IP SAN unit (4). It also communicates with service software modules (6) of IP SAN unit (4) to retrieve a block of data from SAN units (4). The service software modules (9) can be coded or implemented with any suitable programming languages such as C, C++, Java or others. The service software modules (9) may also use any suitable protocols such as IP based or non-IP based protocols.

The host (1), in one embodiment, could be a server, a desktop, a laptop PC, etc., which needs to access a block data storage. The spare host (12) represents a part of recovery scheme that could be implemented in a CCDSVM environment.

Network infrastructure (2) can be any kind of communication links, which could be a department LAN, a corporate intranet, an Internet infrastructure or others. In one embodiment, network infrastructure (2) includes switches, routers, gateways, cables (Ethernet, optical Fibre), wireless communication media, or others. The network infrastructure (2) provides data path between hosts (1), distribute control management station (3), and SAN Units (4). The network infrastructure (2) also includes software infrastructure such as DNS or DHCP for facilitating systems on the net to identifying target addresses, which are used for sending or receiving data within a network domain or in a cross-domain network environment.

It should be noted that DNS and/or other Internet address identification mechanism may be used when a message or data stream is sent from a system A to a system. In addition, the message is sent from source system A to target system B via communication link of this network infrastructure.

Control management station (3) includes distributing control management software modules (7) and console support software modules (8). To support web-based console, it requires the web server software (15). The distribute control management software modules (7) communicate with service modules (6) of IP SAN units (4) to retrieve storage information for constructing a virtual SAN storage pool (11). The communication between distributed control management software modules (7) and service modules (6) of IP SAN units (4) is further configured to monitor IP SAN unit, and to perform various system operations, which include storage configuration and partitioning etc. The control management software modules (7) also communicates with service software modules (9) of host (1) for distributing storage volumes to each hosts (1). The distribute control management software modules (7) can be implemented with any suitable programming languages such as C, C++, Java, XML, etc. The communication protocols between control management station (3) and IP SAN units (4) could be any suitable IP based protocols. The communication between control management station (3) and hosts (1) can be any suitable IP base or non-IP based protocols.

The console support software modules (8) employ inter-process communication mechanism to obtain information relating to IP SAN units (4) from the distributed control management software modules (7). The console support software modules (8) further provide information to web server software (15) through the inter-process communication mechanism. The console support software modules (8) can be implemented with any suitable programming languages such as C, C++, Java, XML, etc.

The web server software (15) communicates with management console software (10) on console host (14) through web protocol such as HTTP. The web server software (15) is configured to provide a centralized storage management capability within the entire distributed virtual SAN infrastructure for any end user over a network. The web server software (15) could be commercially available software or other proprietary software.

To simplify foregoing discussion, the communication path mentioned above will be simply referred to as console support software modules (8), which communicate (send/receive) with management console (10) on console host (14) (without further mentioning the role and function of web server software (15) on control management station).

In addition, to support non-web based console, web server software (15) on control management station (3) is often not required. In this case, the console support software modules (8) could communicate with management console software (10) with a suitable protocol other than a web protocol such as HTTP.

Figure 5:
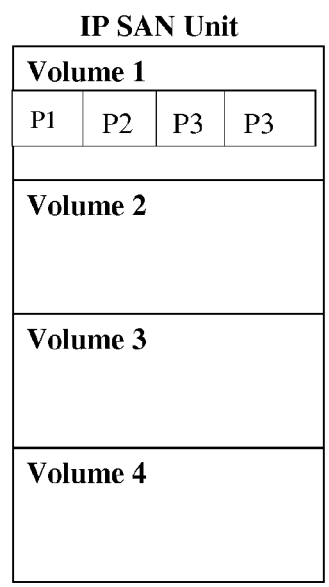
FIG. 5 illustrates an Example of Storage Volume Information of an IP SAN Unit in accordance with one embodiment of the present invention.

The virtual storage pool (11) includes multiple IP SAN units (4), wherein each IP SAN unit further includes service modules (6). The IP SAN units (4) further contain storage media, storage communications and control media. The storage hardware media of each IP SAN unit (4) is configured to have one or more logical volumes. Each volume, in one embodiment, is further partitioned into several portions, as shown in FIG. 5. The IP SAN unit (4) further contains block data services and other service software modules (6). The service software module (6) is configured to communicate with distribute control management station (3) for providing storage information and for performing storage operations. The service software modules (6), in another embodiment, are further configured to communicate with service software modules (9) of hosts (1) for providing block data services for the host (1). The service software modules (6) can be implemented by any suitable programming languages such as C, C++, Java, etc and they may employ any suitable IP based communication protocols for data transfer.

In one embodiment, the control management station (3) and organizes IP SAN units (4) to form the virtual storage pool (11). The virtual storage pool (11) may contain information relating to IP addresses, the storage volumes of the block data, their addresses and sizes of each IP SAN unit (4). A spare IP SAN unit (13) represents a part of recovery scheme used in the central controlled distributed scalable virtual machine environment.

Fibre channel to IP gateway (5) is a component that is configured to provide translation between Fibre Channel based protocol and IP based protocol so that Fibre Channel based SAN unit will appear as if IP based SAN unit to the rest of the world (FIG. 1).

Fibre channel SAN unit is similar to an IP SAN unit (4) except it uses Fibre Channel storage control, which uses Fibre Channel protocol to communicate with other parties over the network. In addition, Fibre Channel SAN unit appears as an IP based SAN unit to the distributed virtual SAN once it connects to a Fibre Channel to IP gateway (5 of FIG. 2). Therefore, to simplify the foregoing discussion, a fibre channel SAN unit will be treated similarly as an IP SAN unit in all of following discussion without additional comments.

The management console on console host (14), which has been described in pending patent of "Concurrent Web Based Multi-Task Support for Control Management System" by the same author. The management console could be a commercially available web browser or a proprietary Web browser. A web browser is able to communicate with web server software (15) on control management station (3) through a web protocol such as HTTP. The Web browser could be implemented by any suitable programming languages such as C, C++, Java, XML, etc. In addition, the management console software module (10) could be a networked software module and/or web browser software. In this case, any other suitable network protocols can be used instead of using web protocol such as HTTP.

To simplify the foregoing discussion, the communication path between management console (10) on console host (14) and the console support software modules (8) on control management station (3) will not further mention the role or function of web server software module (15) in this invention.

From management console (10), multiple concurrent system operations and tasks can be performed for the entire distributed virtual SAN infrastructure. There are may be one or more management consoles of distributed virtual SAN infrastructure anywhere on the net.

Figure 2:
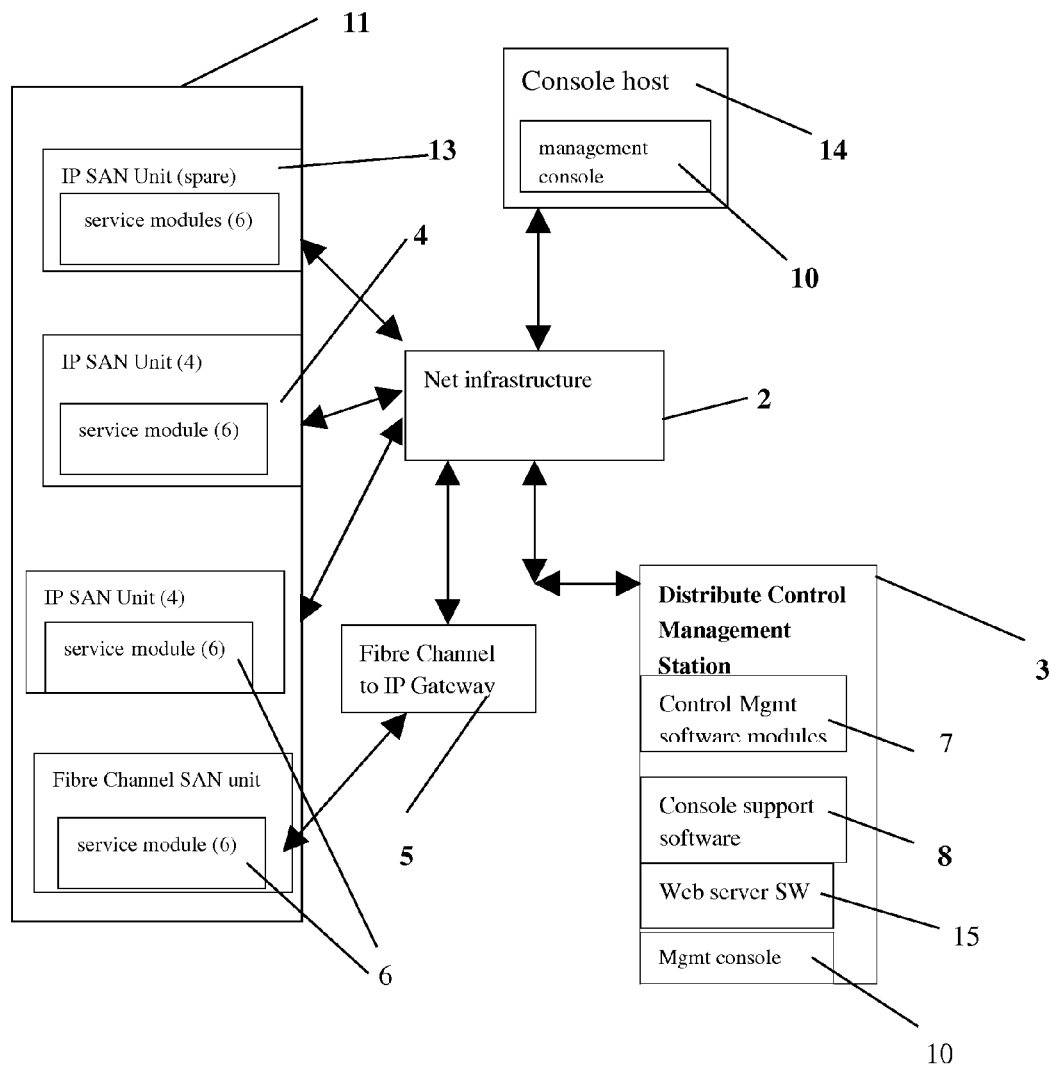
FIG. 2 illustrates actual Components of Distributed Virtual SAN in accordance with one embodiment of the present invention.

FIG. 2 illustrates a portion of FIG. 1 relating to an actual virtual SAN. The multiple SAN units form a virtual Storage pool (11). The virtual storage pool (11) may contain information of each IP SAN unit's IP address, the storage volumes and their sizes, etc.

Figure 3:
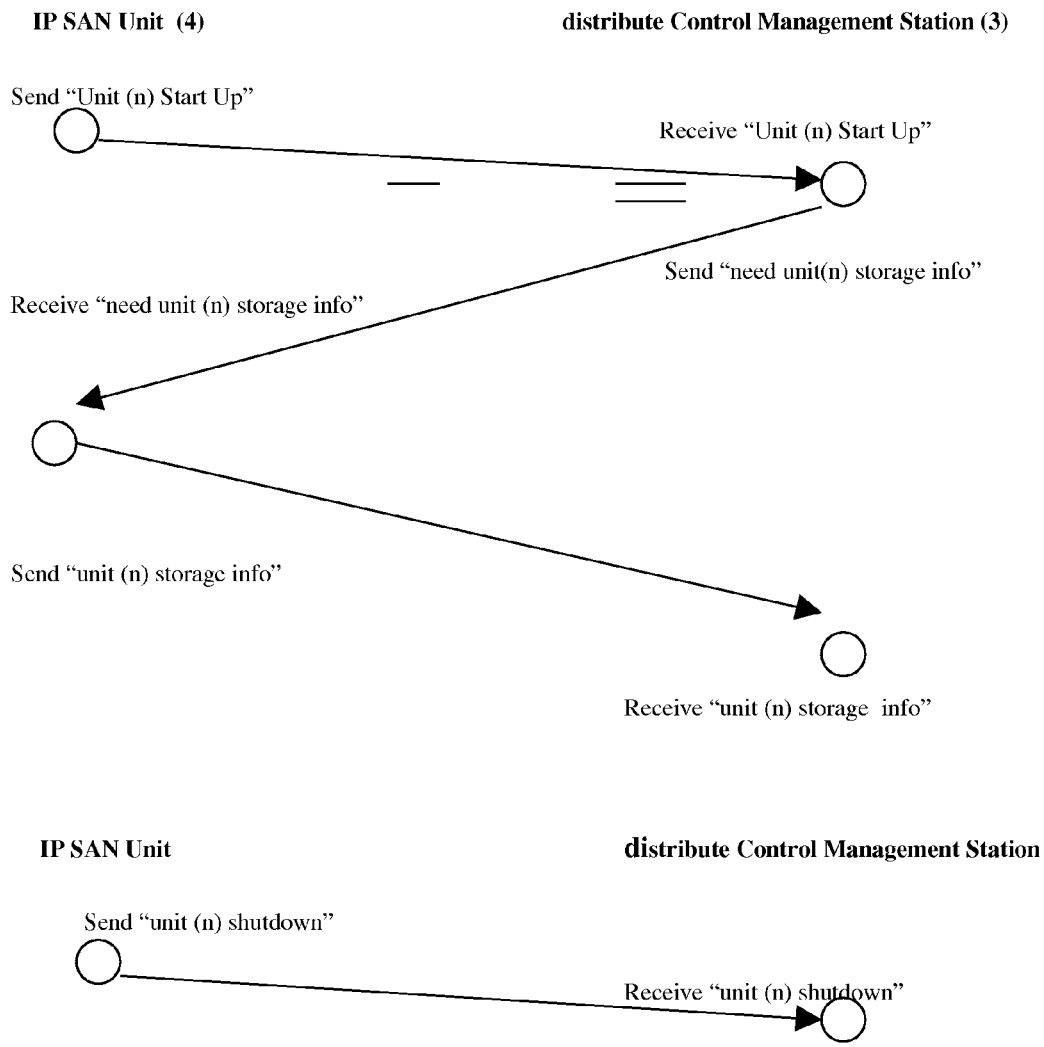
FIG. 3 illustrates Virtual SAN Automatic Configuration Protocol in accordance with one embodiment of the present invention.

FIG. 3 shows a protocol of virtual SAN automatic configuration and building as well as shutting down a virtual SAN. The packet format used with this protocol is described in FIG. 4.

Figure 4:
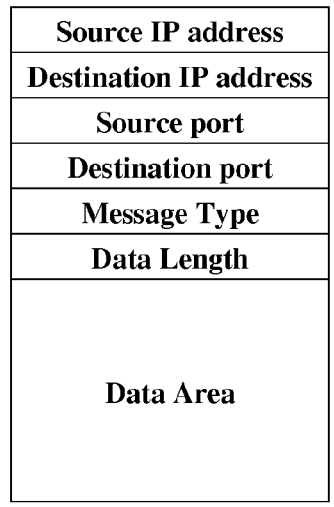
FIG. 4 illustrates a Virtual SAN Auto Configuration Protocol Packet format in accordance with one embodiment of the present invention.

FIG. 4 shows the message format, which is used by "Virtual SAN Automatic Configuration Protocol" for sending and receiving a packet.

FIG. 5 illustrates a storage layout in an IP SAN unit, wherein the storage layout may be further divided into multiple volumes and each volume may be further divided into multiple partitions. Each volume refers to a logical storage unit in this discussion and it might contain multiple pieces of storage space from multiple storage hardware media.

Figure 6:
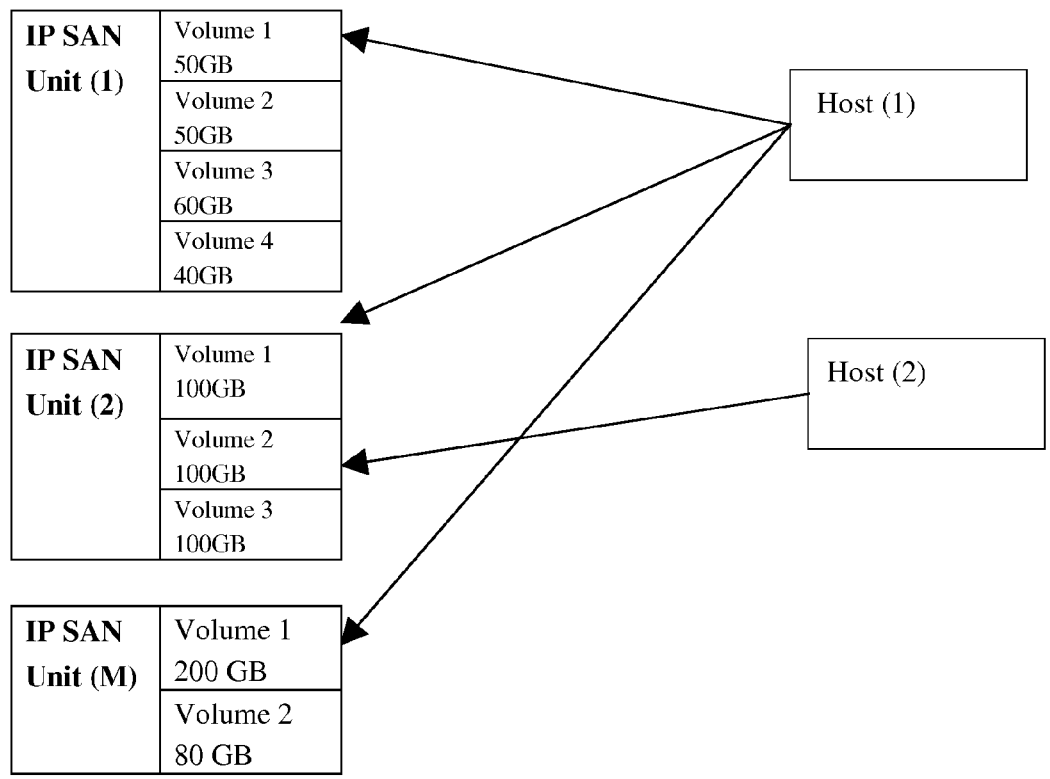
FIG. 6 illustrates a hypothetical example of Storage Volume Requests and Assignment in accordance with one embodiment of the present invention.

FIG. 6 is a simplified and a portion of FIG. 1, which shows a hypothetical example of how hosts are configured to access the Storage Volume of IP SAN units. Where each IP SAN unit is a portion of virtual storage pool (11 of FIG. 2) and each host is substantially the same as presented in FIG. 1.

Figure 8:
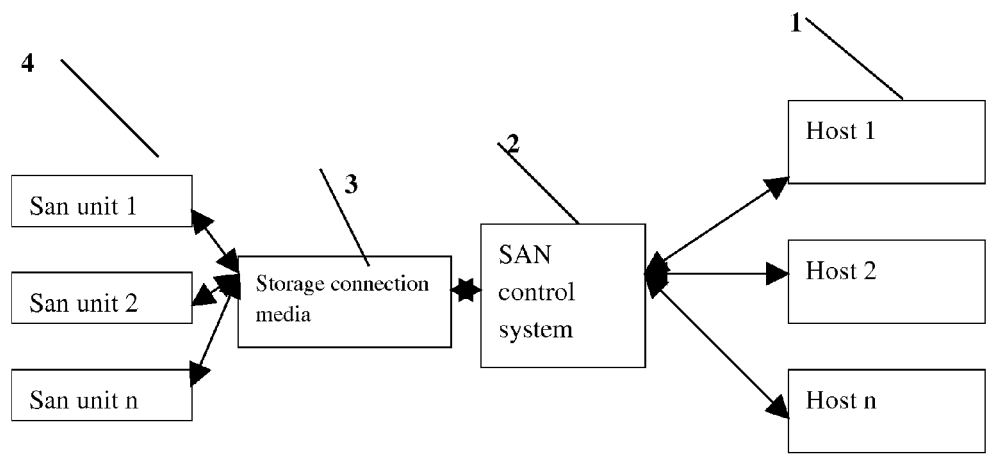
FIG. 8 is an In-Bound Accessed Virtual Storage System.

FIG. 8 is a block diagram illustrating an In-Band Accessed Virtual SAN. FIG. 8 shows another type of virtual SAN, wherein, the actual storage data path from hosts to IP SAN units has to go through control management station.

Figure 9:
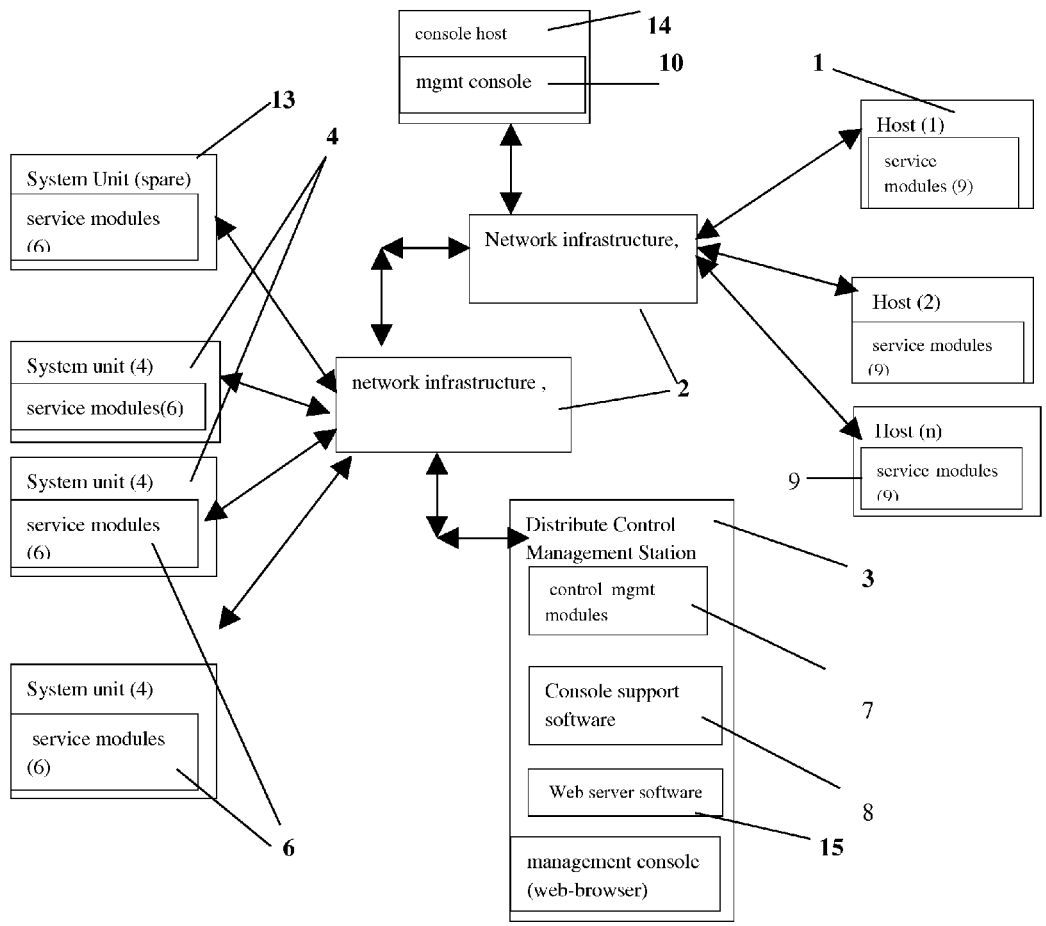
FIG. 9 illustrates a Simplified Diagram of Central Controlled Distributed Scalable Virtual Machine System in accordance with one embodiment of the present invention.

FIG. 9 is a Simplified Diagram of Central Controlled Distributed Scalable Virtual Machine. With this invention, the systems in a CCDSVM can be flexibly organized into multiple different service pools according to their functionalities. For example, multiple IP SAN units can form a virtual SAN storage pool. The hosts of CCDSVM could form other service pools to provide services other than storage services such as video services, security monitor services, and all other services provided on Web (or net).

Figure 10:
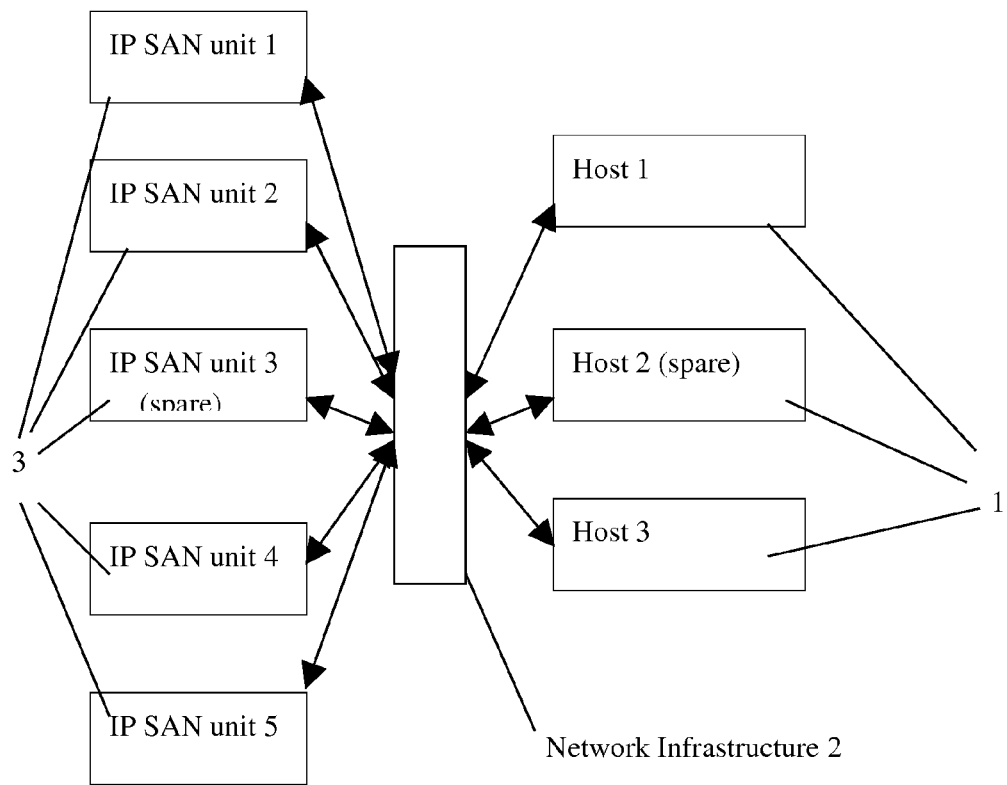
FIG. 10 illustrates a Simplified Diagram of Disaster Recovery Scheme of Distributed Virtual SAN Infrastructure in accordance with one embodiment of the present invention.

FIG. 10 is a Simplified Diagram of Disaster Recovery Scheme of Distributed Virtual SAN Infrastructure, which includes one virtual storage pool of multiple IP SAN units and one service pool of multiple hosts. For example, host 1 accesses IP SAN units 1 and 2 while host 3 accesses IP SAN units 4 and 5. Also, IP SAN unit 1 and 2 are mirrored so that they have kept the same copy of data for host 1. The same to be true for IP SAN unit 4 and 5 with host 3. In addition, IP SAN unit 3 may be a spare unit and the host 2 could be a spare host.

FIG. 1 shows a simplified diagram of a distributed virtual SAN infrastructure according to the present invention. With the distributed virtual SAN infrastructure, the distributed virtual SAN storage pool (11) comprises one or more SAN units (4), which may be further connected to a distribute control management station (3). The SAN units (4) can be accessed by one or more hosts (1) via network infrastructure (2). The entire distributed virtual SAN infrastructure can be operated through management console (10).

The virtual storage volume pool (11) of the distributed virtual SAN infrastructure (FIG. 1) can be initiated and updated when each of the IP SAN units (4) is booted and brought to online. The virtual storage volume pool (11), in one embodiment, is updated when at least one of IP SAN unit is powered down or removed from the web environment. FIG. 3 shows the distributed Virtual SAN Automatic Configuration Protocol, which leads to the success of constructing the virtual storage pool (11) of distributed virtual SAN infrastructure (FIG. 1) according to this invention. The following steps have described the automatic building sequence of storage volume pool of the virtual SAN based on this protocol (FIG. 3). The protocol described bellow could be IP based protocol such as SNMP, or a much simple UDP protocol (FIG. 4), or any other suitable protocols.

When any of IP SAN unit (4) such as unit (n) brought up online, SAN service modules (6 of FIG. 2) of the IP SAN unit (4) sends out a "SAN unit (n) startup" packet, as illustrated in FIG. 4, to distribute control management station (3 of FIG. 1). The "SAN unit (n) startup" packet could be a simple user defined UDP packet (FIG. 4) indicating a system just being powered up. The message carried by the packet could also be a SNMP trap of cold start packet, or link-up packet (4 of FIG. 1) or other short packet/message of any suitable IP protocols.

When distribute control management modules (7 of FIG. 1) of distribute control management station (3 of FIG. 1) receives IP SAN unit (n)'s message, it stores the IP SAN unit (n)'s information.

After storing information of the IP SAN unit, the control management modules (7 of FIG. 1) on distribute control management station (3 of FIG. 1) sends back a "need SAN unit (n)'s storage info" packet to IP SAN unit (n) (4 of FIG. 1).

When SAN service modules (6 of FIG. 1) on IP SAN unit (n) (4 of FIG. 1) receive the packet of "need SAN unit (n)'s storage info", they obtain the storage information on the IP SAN unit (n) (4 of FIG. 1), which may include the number of storage volumes, each volume's starting address (logical block address, LBA), length, and the end address (logical block address, LBA). The SAN service modules (6 of FIG. 1) then send back a packet of "unit (n) storage info", which may include all information obtained from the control management station (3 of FIG. 1).

After receiving the "unit (n) storage info" packet from IP SAN unit (n) (4 of FIG. 1), the distribute control management modules (7 of FIG. 1) on distribute control management station (3 of FIG. 1) update the stored information of virtual storage pool (11 of FIG. 1) with corresponding storage information of IP SAN unit (n) from packet.

When any one of IP SAN unit (n) is shutting down, the service module (6 of FIG. 1) of the IP SAN unit (n) (4 of FIG. 1) sends a "Unit (n) shutdown" message to the distribute control management station (3 of FIG. 1). This shutdown message could be an SNMP trap of link down, or a simple UDP packet (FIG. 4) with message type of system down, or other short packet based on some other protocols.

After receipt of the "unit (n) shutdown" packet from IP SAN unit (n) (4 of FIG. 1), the distribute control management modules (7 of FIG. 1) on distribute control management station (3 of FIG. 1) update information of the virtual storage pool (11 of FIG. 1), which is specific to the IP SAN unit (n) (4 of FIG. 1).

After one or more IP SAN units (4 of FIG. 1) are online, the control management station (3 of FIG. 1) obtains and/or stores information relating to storage volumes and networking protocols for every IP SAN unit (4 of FIG. 1) in the virtual storage pool (11 of FIG. 1). Therefore, the control management station (3 of FIG. 1) is able to distributed storage volumes to hosts (1 of FIG. 1) in several steps.

First, the host 1 (1 of FIG. 1) sends a request to control management station (3 of FIG. 1) requesting a storage space, such as 80 GB (gigabyte) of storage. Second, the control management station (3 of FIG. 1) stores host 1 information and searches for availability of 80 GB of storage volume. The control management station (3), for example, finds an 80 GB available storage volume in volume 2 of the IP SAN unit M (FIG. 6). Third, the control management station (3 of FIG. 1) sends the requested information of host 1 to IP SAN unit M (FIG. 6), wherein the requested information includes the IP address of host 1 and the requested storage size. The control management station (3 of FIG. 1) also sends the storage volume information relating to the IP SAN unit M to host 1 (1 of FIG. 1), wherein the storage volume information includes the IP address of IP SAN unit M, the volume number and the size, the volume's starting address, and volume's ending logical address block (LBA). Therefore, all parties of three, namely the control management station (3) and host 1 and the IP SAN unit M, keep the same storage volume assignment information. Fourth, once the host 1 (1 of FIG. 1) and IP SAN unit M (FIG. 6) get each other's information, the host (1 of FIG. 1) can directly and independently access the volume 2 on IP SAN unit M immediately and the IP SAN unit M, in one embodiment, is further configured to perform security checking in light of storage accessing.

Alternatively, the above described steps may also be semi-automatically setup with assisting of system operations performed by the management console (10 of FIG. 1). For example, an administrator could initially setup volume 2 of IP SAN unit M (FIG. 6) to be exclusively accessed by host 1 (1 of FIG. 1) as long as the administrator acknowledges that host 1 needs such size of storage volume. The administrator can also setup the host 1 with all information needed to access volume 2 of IP SAN unit M (FIG. 6). Finally, the host 1 (1 of FIG. 1) can access volume 2 of IP SAN unit M (FIG. 6) directly without going through the control management station (3 of FIG. 1).

The present invention also discloses a mechanism of dynamically expanding storage capacity. After the distributed virtual SAN storage pool (11 of FIG. 1) is initiated, the host (1 of FIG. 1) will be able to access the volume of an IP SAN unit (4 of FIG. 1) in the pool (11 of FIG. 1) directly without further involvement of the control management station (3 of FIG. 1). This will allow the storage pool (11 of FIG. 1) of this distributed virtual SAN infrastructure (FIG. 1) to continue expanding without affecting any hosts (1 of FIG. 1) to continue accessing the storage volumes on assigned IP SAN units (4 of FIG. 1) in the pool. As a result, this guarantees that the distributed virtual SAN storage pool (11 of FIG. 2) can be dynamically expanded without interrupting any normal storage operations and accessing of entire distributed virtual SAN storage pool (11 of FIG. 2).

The present invention further discloses a technique of system scalability. Once the distributed virtual SAN storage pool (11 of FIG. 1) is constructed, each host (1 of FIG. 1) can access one or more IP SAN units (4 of FIG. 1) in the storage pool (11 of FIG. 1) of the distributed virtual SAN infrastructure (FIG. 1) whenever it requests. For example, host 1 (FIG. 6) can access IP SAN unit 1, unit 2, and unit M (FIG. 6) after the host (1) requests an access to the IP SAN units and subsequently, the control management station (3 of FIG. 1) grants the request. This effectively provides scalable storage system for each hosts (1 of FIG. 1) within distributed virtual SAN infrastructure (FIG. 1) of this invention. Further, the distributed virtual SAN infrastructure (FIG. 1) provides far better scalability than the in-band accessed virtual SAN (FIG. 8), wherein the scalability of in-band accessed virtual SAN were severely limited by the bottlenecked control management station (FIG. 8).

The present invention also discloses a method of storage sharing mechanism. Once the distributed virtual SAN storage pool (11 of FIG. 1) is constructed, each IP SAN unit (4 of FIG. 1) in the pool of distributed virtual SAN infrastructure (FIG. 1) may hold multiple storage volumes in the form of block data, which can be accessed by one or more hosts (1 of FIG. 1). Therefore, it allows multiple hosts (1 of FIG. 1) to share an IP SAN unit (4 of FIG. 1) by granting and assigning each host to exclusively access particular volumes on that IP SAN unit (4 of FIG. 1). The FIG. 6 demonstrates such a storage sharing, wherein IP SAN unit (2 of FIG. 6) has three volumes, which named volume 1, volume 2, and volume 3. The block data service modules (6 of FIG. 1) on IP SAN unit (2 of FIG. 6) allows volume 1 to be accessed exclusively by host 1 while volume 2 to be accessed exclusively by host 2.

Figure 7:
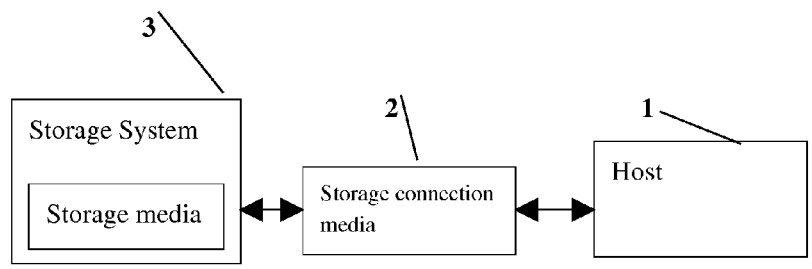
FIG. 7 is a conventional Direct Attached Storage System.

With in-band accessed virtual SAN (FIG. 8), the control management station could be a performance bottleneck. With distributed virtual SAN of this invention, each host (1 of FIG. 1) can directly and independently access any IP SAN unit (4 of FIG. 1). Therefore, the performance of storage accessing for each host will not be affected and can match the performance of direct attached storage system (FIG. 7) when the high speed network connecting media is deployed in the distributed virtual SAN infrastructure (FIG. 1).

The present invention also illustrates a method of a centralized management of distributed virtual SAN. The storage management console on a console host (10 of FIG. 1) can communicate with console support software module (8 of FIG. 1) on a control management station (3 of FIG. 1). The storage management console is configured to further receive information relating to all IP SAN units (4) from control management modules (7 of FIG. 1) of control management station (3 of FIG. 1). Therefore, it provides centralized management functionality for entire distributed virtual SAN storage pool (11 of FIG. 1), hosts (1 of FIG. 1), and the control management station itself (3 of FIG. 1). With multiple concurrent tasks controlled by the console support software module (8 of FIG. 1) of control management station (3 of FIG. 1), the storage management support console (10 of FIG. 1) can provide a full range of system operations and tasks. In addition, multiple system tasks and operations can be run concurrently throughout the entire distributed virtual SAN and hosts. These management tasks include storage configuration, storage volume allocation and assignment, storage partitioning and repartitioning, storage, network, and other resource usage and activity monitoring.

In one embodiment, the present invention discloses a process of disaster recovery capabilities. The use of DNS or an IP address identification mechanism helps this distributed virtual SAN infrastructure to overcome the geometric (region) limitation, and works well in a cross network domain environment or in a single network domain environment. Therefore, any IP SAN unit or host as well as a control management station could be anywhere on the corporate Intranet, department LAN, or Internet. As a result, the present invention can be used for an emergency or a disaster recovery plan because the distributed virtual SAN infrastructure increases logical range by 100 miles as oppose to the traditional 10-kilometer limitation.

In addition, the disaster recovery plan of distributed virtual SAN infrastructure can be flexibly implemented as showing in FIG. 10. With this recovery plan, the host 1 or 3 (1 of FIG. 10) can continue to operate even if one of its mirrored IP SAN units failed (3 of FIG. 10). Also, the spare IP SAN unit can be used to quickly replace the failed IP SAN unit whenever there is a need. On the other hand, the hosts (1 of FIG. 10) also can be organized into a service pool for providing special services, such as distributing video services, distributed database pool, distributed security monitor services, and all other services provided on the net or the Web. Therefore, whenever host 1 or 3 failed, the spare host can quickly take over their assigned IP SAN storage and replace them to continue providing services to the end user.

It should be noted that the storage of any IP SAN unit can be shared and accessed by multiple hosts. To scale a virtual storage, a host may be assigned to access multiple volumes of storage capacities from multiple IP SAN units. In one embodiment, the storage accessing goes directly through communication link between hosts and SAN units, which means that it is an out-band access. An advantage of using the present invention is that it has better performance and scalability than that in-band accessed virtual SAN. Furthermore, the present invention allows the virtual storage pool to expand dynamically through adding more IP SAN units into the pool without interrupting systems operation.

The implementation of web-based multi-concurrent tasks allows entire distributed virtual SAN infrastructure to be managed and monitored from a centralized console. Also, the IP based distributed virtual SAN infrastructure is a new type of central controlled distributed scalable virtual machine (CCDSVM). The software modules used in IP based distributed virtual SAN infrastructure are web based operating system models. Furthermore, the methods and principles of the IP based distributed virtual SAN storage pool, which may automatic build and deliver storage services to the end users or clients on-demand bases. The present invention can also apply to various data distribution services within the CCDSVM infrastructure.

What is claimed is:

1. A web system comprising:
    a plurality of storage servers;
    a plurality of host computing devices; and
    at least one control server being configured to centrally control operations of the storage servers and the host computing devices;
    wherein the control server centrally controls:
        automatically forming one or more storage service pools through communicating with each of the storage servers across a first communication network; and
        automatically forming a plurality of application service pools through communicating with each of the host computing devices across a second communication network; and
    wherein each of the storage servers in each of the one or more storage service pools is operable to deliver storage service to at least one of the host computing devices in one of the application service pools for allowing the one of the host computing devices utilizing the storage service to deliver a specific service, and
    wherein each of the host computing devices in each of the application service pools is operable to automatically send a request to the control server for requesting an available storage space in one of the storage servers of one of the one or more storage service pools whenever there is a need for more storage capacity to deliver a specific service.

2. The web system of claim 1, wherein said forming one or more storage service pools further comprises:
    executing a storage service pool automatic construction protocol between the control server and each of network attached storage ("NAS") servers among the plurality of storage servers to form a NAS service pool.

3. The web system of claim 1, wherein said forming one or more storage service pools further comprises:
    executing a storage service pool automatic construction protocol between the control server and each of storage area network ("SAN") servers among the plurality of storage servers to form a SAN service pool.

4. The web system of claim 1, wherein said forming a plurality of application service pools further comprises:

executing an application service pool automatic construction protocol between the control server and each of the host computing devices to assign the each of the host computing devices, according to a specific service configured therein, into a corresponding one of the application service pools.

5. The web system of claim 1, wherein the control server centrally controls distributing a first request for a storage space, received from a first one of the host computing devices, to a first one of the storage servers that has the storage space available for the first request to allow the first one of the host computing devices directly access to the available storage space.

6. The web system of claim 5, wherein the control server further distributes a second request for a storage space, received from the first one of or a second one of the host computing devices, to a second one of the storage servers only when the first one of the storage servers does not have the storage space available for the second request while the second one of the storage servers has.

7. The web system of claim 1, wherein said centrally controlling operations further comprises:
displaying a web UI ("user interface"), comprising information of the web system, on a console device to allow a user via the UI displayed to submit one or more operating requests for centrally operating the web system.

8. The web system of claim 1, wherein said delivering a specific service further comprising:
configuring one of the application service pools to comprise one or more of the host computing devices each of which configured to dedicatedly deliver video services by utilizing one or more storage spaces in one or more of the storage servers.

9. The web system of claim 1 wherein said delivering a specific service further comprises:
configuring one of the application service pools to comprise one or more of the host computing devices each of which configured to dedicatedly deliver file services by utilizing one or more storage spaces in one or more of the storage servers.

10. The web system of claim 7, wherein said operating the web system further comprising:
allowing at least a second one of the operating requests to be submitted via the displayed UI after a first one of the operating requests being submitted thereof without waiting for completion of executing the first one of the operating requests.

11. The web system of claim 1, wherein said delivering a specific service further comprising:
configuring one of the application service pools to comprise one or more of the host computing devices each of which configured for dedicatedly delivering web services by utilizing one or more storage spaces in one or more of the storage servers.

12. The web system of claim 10, wherein each of the first and second operating requests is for storage configuration or partition, for data backup or restoration, for file system or directory structure creation, for data transfer or replication, or for user authentication.

13. The web system of claim 1 wherein said delivering a specific service further comprises:
configuring one of the application service pools to comprise one or more of the host computing devices each of which configured to dedicatedly deliver database services by utilizing one or more storage spaces in one or more of the storage servers.

14. The web system of claim 1, wherein each of the first and second communication networks is one of a corporate storage network, a corporate Intranet, the Internet, a wide are network ("WAN") or a local area network ("LAN") that comprises of wired and wireless communication links.

15. The web system of claim 10, wherein each of the first and second operation requests further is for monitoring status of storages, networks, hardware processors, or processes/threads configured in one of the application servers or the storage servers.

16. A computer program product comprising:
a non-transitory computer-readable medium comprising program instructions for controlling operations of a web system that has at least one control server, a plurality of storage servers, and a plurality of host computing devices, the non-transitory computer-readable medium comprising:
program instructions that, when executed by the control server, cause the control server to centrally control operations of the web system,
wherein the control server controls automatically forming one or more storage service pools through communicating with each of the storage servers across a first communication network, and controls automatically forming a plurality of application service pools through communicating with each of the host computing devices across a second communication network;
program instructions that, when executed by each of the storage servers, cause the each of the storage servers in each of the one or more storage service pools operable to deliver storage service to at least one of the host computing devices in one of the application service pools to allow the one of the host computing devices utilizing the storage service to deliver a specific service; and
program instructions that, when executed by each of the host computing devices, cause the each of the host computing devices in each of the application service pools operable to automatically send a request to the control server for requesting an available storage space in one of the storage servers of one of the one or more storage service pools whenever there is a need for more storage capacity to deliver a specific service.

17. The computer program product of claim 16, wherein the non-transitory computer-readable medium further comprises program instructions to cause the control server distributing a first request for a storage space, received from a first one of the host computing devices, to a first one of the storage servers that has the storage space available for the first request to allow the first one of the host computing devices directly access to the available storage space.

18. The computer program product of claim 16, wherein the non-transitory computer-readable medium further comprises program instructions to cause the control server to control executing an application service pool automatic constructing protocol between the control server and each of the host computing devices to assign the each of the host computing devices, according to a specific service configured therein, into a corresponding one of the application service pools.

19. The computer program product of claim 16, wherein each of said first and second operating requests is for storage configuration or partitioning, for data backup or restore, for file system or directory structure creation, for data transfer, replication or operation, or for user authentication.

20. The computer program product of claim 16, wherein the non-transitory computer-readable medium further comprises program instructions to cause a storage service pool automatic construction protocol to be executed between the control server and each of storage area network ("SAN") servers among the storage servers to automatically form a SAN service pool.

21. The computer program product of claim 16, wherein the non-transitory computer-readable medium further comprises program instructions to cause a storage service pool automatic construction protocol to be executed between the control server and each of network attached storage ("NAS") servers among the storage servers to automatically form a NAS service pool.

22. The computer program product of claim 16, wherein the non-transitory computer-readable medium comprises program instructions to cause the control server to:
display a UI ("user interface"), comprising information of the web system, on a console device to allow a user via the UI displayed to submit one or more operating requests for centrally operating the web system.

23. The computer program product of claim 17, wherein the control server further distributes a second request for a storage space, received from the first one of or a second one of the host computing devices, to a second one of the storage servers when the first one of the storage servers does not have the storage space available for the second request while the second one of the storage servers has.

24. A method of controlling operations for a web system that has at least one control server, a plurality of storage servers, and a plurality of host computing devices, the method comprising:
configuring the control server to centrally control operations of the web system,
wherein the control server controls to automatically form one or more storage service pools through communicating with each of the storage servers across a first communication network and controls to automatically form a plurality of application service pools through communicating with each of the host computing devices across a second communication network; and
distributing, by the control server, one or more requests for centrally operating the web system,
wherein each of the storage servers in each of the one or more storage service pools is operable to deliver storage service to at least one of the host computing devices in one of the application service pools for allowing the one of the host computing devices utilizing the storage service to deliver a specific service, and
wherein each of the host computing devices in each of the application service pools is operable to automatically send a request to the control server for requesting an available storage space in one of the storage servers of one of the one or more storage service pools whenever there is a need for more storage capacity to deliver a specific service.

25. The method of claim 24, wherein said automatic forming one or more storage service pools further comprises:
executing a storage service pool automatic construction protocol between the control server and each of network attached storage (hereinafter "NAS") servers among the storage servers to form a NAS service pool.

26. The method of claim 24, wherein said automatic forming one or more storage service pools further comprises:
executing a storage service pool automatic construction protocol between the control server and each of storage area network (hereinafter "SAN") servers among the storage servers to form a SAN service pool.

27. The method of claim 24, wherein said automatic forming a plurality of application service pools comprises:
executing an application service pool automatic construction protocol between the control server and each of the host computing devices to assign the each of the host computing devices, in accordance to a specific service configured therein, into a corresponding one of the application service pools.

28. The method of claim 24, wherein said delivering a specific service further comprising:
configuring one of the application service pools to comprise one or more of the host computing devices each of which configured to dedicatedly deliver file services by utilizing one or more storage spaces in one or more of the storage servers.

29. The method of claim 24, wherein each of said first and second communication networks is one of a corporate storage network, a corporate Intranet, the Internet, a wide are network ("WAN") or a local area network ("LAN") that comprises of wired and wireless communication links.

30. The method of claim 24, wherein said control server distributing one or more requests further comprises:
distributing a first request for requesting a storage space, received from a first one of the host computing devices, to a first one of the storage servers that has the storage space available for the first request to allow the first one of the host computing devices directly access to the available storage space.

31. The method of claim 24, wherein said delivering a specific service further comprises:
configuring one of the application service pools to comprise one or more of the host computing devices each of which configured to dedicatedly deliver video services by utilizing one or more storage spaces in one or more of the storage servers.

32. The method of claim 30 further comprising:
distributing a second request for a storage space, received from the first one of or a second one of the host computing devices, to a second one of the storage servers when the first one of the storage servers does not have the storage space available for the second request while the second one of the storage servers has.

33. The method of claim 24, wherein said control server centrally controlling of the operations further comprises:
displaying a UI ("user interface"), comprising information of the web system, on a console device to allow a user via the UI displayed to centrally operate the web system.

34. The method of claim 33, wherein said control server distributing one or more requests further comprises:
distributing one or more operating requests, received from the console device, to one or more of the storage servers or the host computing devices for further executing each of the one or more operating requests.

35. The method of claim 24, wherein said delivering a specific service further comprises:
configuring one of the application service pools to comprise one or more of the host computing devices each of which configured to dedicatedly deliver web services by utilizing one or more storage spaces in one or more of the storage servers.

36. The method of claim 24, wherein said delivering a specific service further comprises:
configuring one of the application service pools to comprise one or more of the host computing devices each of which configured to dedicatedly deliver database services by utilizing one or more storage spaces in one or more of the storage servers.

37. A computer program product comprising:
a non-transitory computer-readable medium comprising program instructions for controlling automatically to form a plurality of service pools in a web system that has a plurality of servers and a control server,
the non-transitory computer-readable medium comprising program instructions to be executed by the control server and program instructions to be executed by each of the servers for carrying out a service pool automatic construction protocol between the control server and the each of the servers to form the plurality of service pools, wherein
the protocol comprises:
a) sending automatically by a first one of the servers a packet to the control server across a communication network to inform the control server that the first one of the servers is going online upon the first one of the servers being brought online;
b) receiving by the control server the packet from the first one of the servers and storing identification of the first one of the servers, obtained via the received packet, for the service pools, and
c) sending back an enquiring packet to the first one of the servers for requesting information of a specific service that the first one of the servers will deliver;
d) receiving, by the first one of the servers, the enquiring packet from the control server, and
sending a response packet back to the control server, where the response packet comprises detailed information of the specific service configured in the first one of the servers; and
e) receiving, by the control server, the response packet from the first one of the servers, assigning the first one of the servers, according to the specific service configured therein, into a first one of the service pools and updating the stored information of the first one of the servers for updating the first one of the service pools by including the detailed information about the specific service obtained via the response packet.

38. The computer program product of claim 37 wherein said updating stored information for the first one of the service pools further comprises: updating the first one of the service pools in response to change status of any one of the servers in the one of the service pools when the any one of the servers being shutdown, disconnected, or reconnected.

39. The computer program product of claim 37, wherein said first one of the service pools is one of a file service pool, video service pool, network attached storage ("NAS") service pool, storage area network ("SAN") service pool, security monitoring service pool, web service pool, or database service pool.

40. The computer program product of claim 37, wherein said communication network is one of a corporate storage network, a corporate Intranet, the Internet, a local area network ("LAN"), or a wide area network ("WAN") that comprises of wired and wireless communication links.

41. The computer program product of claim 37 further comprising
executing the service pool automatic construction protocol between the control server and at least a second one of the servers to assign the second one of the servers, according to a specific service configured therein, into the first one of or a second one of the service pools when the second one of the servers is brought online.

42. The computer program product of claim 16, wherein the non-transitory computer-readable medium comprises program instructions to causes the control server configuring one of the application service pools to comprise one or more of the host computing devices each of which configured to dedicatedly deliver database services by utilizing one or more storage spaces in one or more of the storage servers.

43. The computer program product of claim 16, wherein the non-transitory computer-readable medium comprises program instructions to cause the control server configuring one of the application service pools to comprise one or more of the host computing devices each of which configured to dedicatedly deliver web services by utilizing one or more storage spaces in one or more of the storage servers.

44. The computer program product of claim 16, wherein the non-transitory computer-readable medium comprises program instructions to cause the control server configuring one of the application service pools to comprise one or more of the host computing devices each of which configured to dedicatedly deliver video services by utilizing one or more storage spaces in one or more of the storage servers.

45. The computer program product of claim 16, wherein the non-transitory computer-readable medium comprises program instructions to cause the control server configuring one of the application service pools to comprise one or more of the host computing devices each of which configured to dedicatedly deliver file services by utilizing one or more storage spaces in one or more of the storage servers.

46. The computer program product of claim 22, wherein said centrally operating the web system comprises:
allowing at least a second operating request to be submitted via the displayed UI after a first operating request submitted thereof without waiting for completion of executing the first operating request.

47. The computer program product of claim 46, wherein each of the first and second operating requests further is for monitoring status for storages, networks, hardware processors, or processes/threads in one of the application servers or the storage servers in the web system.

48. The computer program product of claim 22, wherein said control server distributes each operating request received from the console device to one of the storage servers or the host computing devices for carrying out said each operating requests.

* * * * *

UNITED STATES PATENT AND TRADEMARK OFFICE
CERTIFICATE OF CORRECTION

PATENT NO. : 8,688,772 B2  
APPLICATION NO. : 12/009936  
DATED : April 1, 2014  
INVENTOR(S) : Sheng Tai Ted Tsao It is certified that error appears in the above-identified patent and that said Letters Patent is hereby corrected as shown below:

IN THE SPECIFICATION:

By restoring the original limitation disclosed in parent application 10/713,905 filed on 07/22/2003 as follow:

In col. 3, line 43-44, please replace ", which may be used to send the SNMP" with --sent by the SNMP--;

In col. 3, line 57, please replace "retrieve a block of" with --retrieve block--;

In col. 4, line 16, please replace "system A to a system" with --system A to a system B--;

In col. 4, line 46, please replace "provide information" with --provide the information--;

In col. 5, line 25, please replace "and organizes IP" with --organizes IP--;

In col. 5, line 57, please replace "and/or web browser" with --other than web browser--;

In col. 7, line 31, please replace "obtained from" with --obtained, to--;

In col. 7, line 53, please replace "obtained and/or" with --obtained and--;

In col. 7, line 54-55, please replace "networking protocol" with --networks--;

IN THE CLAIMS:

In col. 15, line 46, please replace "in the one of the service" with --in the first one of the service--.

Signed and Sealed this  
Tenth Day of June, 2014

Michelle K. Lee  
*Deputy Director of the United States Patent and Trademark Office*